(12) United States Patent
Krempel et al.

(10) Patent No.: US 8,585,005 B2
(45) Date of Patent: Nov. 19, 2013

(54) DEVICE FOR MOUNTING AN ELECTRIC BLOWER DRIVE MOTOR ON THE HOUSING OF A HEATING, VENTILATING AND/OR AIR CONDITIONING UNIT FOR VEHICLES

(75) Inventors: Günter Krempel, Bad Rodach (DE); Clemens Wachter, Stockeim (DE); Heiko Reiss, Schmiedefeld (DE); Ralph Stroehla, Coburg (DE); Marius Gorchs, Coburg (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 594 days.

(21) Appl. No.: 11/818,409

(22) Filed: Jun. 14, 2007

(65) Prior Publication Data
US 2008/0042039 A1 Feb. 21, 2008

(30) Foreign Application Priority Data
Jul. 31, 2006 (DE) .......................... 10 2006 035 583

(51) Int. Cl.
*F16M 13/00* (2006.01)
(52) U.S. Cl.
USPC ............................ 248/634; 248/560; 248/632
(58) Field of Classification Search
USPC ............ 248/634, 632, 638, 560, 580; 310/91, 310/51
See application file for complete search history.

(56) References Cited

U.S. PATENT DOCUMENTS

| 4,200,257 | A | * | 4/1980 | Litch, III ....................... 248/604 |
| 5,786,647 | A | * | 7/1998 | Vollmer et al. ................. 310/89 |
| 6,076,795 | A | * | 6/2000 | Scheidel et al. .............. 248/603 |
| 6,505,807 | B1 | | 1/2003 | Nolting et al. |
| 6,552,457 | B2 | * | 4/2003 | Uruma et al. ................... 310/91 |
| 6,897,580 | B2 | * | 5/2005 | White .............................. 310/51 |
| 7,118,018 | B2 | * | 10/2006 | Turk ................................ 227/10 |
| 7,566,998 | B2 | * | 7/2009 | Winkler et al. ................. 310/51 |
| 7,637,486 | B2 | * | 12/2009 | Goudie .................... 267/140.13 |
| 7,679,233 | B2 | * | 3/2010 | Winkler et al. ................. 310/51 |
| 2002/0047080 | A1 | * | 4/2002 | Guillemot ..................... 248/562 |
| 2004/0032177 | A1 | * | 2/2004 | Nitzsche et al. ................ 310/91 |
| 2005/0253029 | A1 | * | 11/2005 | Gibb et al. ..................... 248/158 |

FOREIGN PATENT DOCUMENTS

| DE | 19613041 A1 | 10/1997 |
| DE | 19746185 A1 | 4/1999 |
| EP | 1320172 A1 | 6/2003 |

OTHER PUBLICATIONS

English language Search Report for International Application No. EP 07 11 3186, dated Nov. 6, 2007; 2 pages.
English language Abstract for International Application No. EP 1 320 172, dated Oct. 8, 2010, from the European espacenet.com; 1 page.
English language machine created translation for International Application No. DE 196 13 041, from the European Patent Office, dated Oct. 8, 2010; 3 pages.

* cited by examiner

*Primary Examiner* — Amy J. Sterling
(74) *Attorney, Agent, or Firm* — Howard & Howard Attorneys PLLC

(57) ABSTRACT

In a device for mounting an electric blower drive motor in a housing of a heating, ventilating and/or air conditioning unit for vehicles, having a motor adapter (12), which accommodates the driving motor, and a damping device (16), which connects the motor adapter (12) with the housing (10) so as to create a form-lock, the motor adapter (12) and the damping device (16) are integrated in the housing (16). The housing (10) is manufactured with the damping device (16) and with the motor adapter (12) in a casting process for molding of several components.

17 Claims, 4 Drawing Sheets

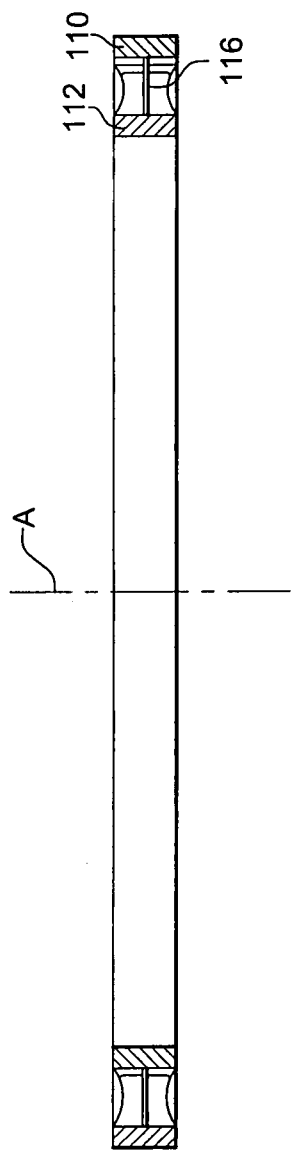
Fig. 5a
Fig. 5b
Fig. 5c
Fig. 5d

DEVICE FOR MOUNTING AN ELECTRIC BLOWER DRIVE MOTOR ON THE HOUSING OF A HEATING, VENTILATING AND/OR AIR CONDITIONING UNIT FOR VEHICLES

RELATED APPLICATIONS

This application claims priority to and all the advantages of German Patent Application No. DE 102006035583.0, filed on Jul. 31, 2006.

BACKGROUND OF THE INVENTION

1. Field of the Invention

The invention relates to a device for mounting an electric blower drive motor on the housing of a heating, ventilating and/or air conditioning unit for vehicles, having a motor adapter, which accommodates a drive motor and a damping device, which connects the motor adapter with the housing in a form-locked manner.

2. Description of the Related Art

With a similar device, the task of the damping device is to keep vibrations and shaking of the blower drive motor away from the housing of the heating, ventilating and/or air conditioning unit. At the same time, however, the mechanical support of the blower drive motor on the housing must also be ensured. Therefore, the damping device must, on the one hand, be flexible and able to absorb vibration, while on the other hand, it also must possess the rigidity which is required for mechanical support. The effort to meet both requirements has led in prior art to construction forms in which a great amount of space is required, as well as a relatively complicated assembly. Thus for example, in the motor mounting according to DE 196 13 041 A1, cylinder-shaped damping elements are arranged in the axial direction of the blower drive motor and connected at their ends in a form-locked manner with the radial projections of the housing or of the motor adapter. Additional holding clamps are provided to ensure the form-locked connection. Accordingly, a greater amount of space is required for the construction due to the axial arrangement of the damping elements.

BRIEF SUMMARY OF THE INVENTION

The invention provides a device for the mounting of an electric blower drive motor, which is characterized by a very simple construction, as well as a simple assembly. In accordance with the invention, the motor adapter and the damping device are integrated in the housing. The integration of the housing, motor adaptor and damping device makes it possible to use fewer manufacturing and assembly operations. Since the thickness of the wall of the damping device hardly exceeds that of the housing, an advantageous small size results.

In the preferred embodiment, the housing is manufactured with the damping device and the motor adapter in a casting process for moulding of several components. As an alternative, the manufacturing is carried out in a sequential casting process. Both processes enable a particularly economical mass production.

In an advantageous embodiment, the damping device is formed from a ring of rubber-elastic material, which surrounds the motor holder, and is then surrounded by the housing. The ring can have radial projections, which are engaged in a form-lock manner in corresponding recesses of the housing and/or the motor adapter. This embodiment is characterized by small axial size, by good mechanical support and good centring as well as positioning of the motor adaptor on the housing. Through the radial projections of the damping device, loads are deflected in the circumferential direction.

A good form-lock between the damping device and the housing on the one hand, and the motor adapter on the other hand, is achieved in the preferred embodiment in that the damping device radially overlaps the boundary of the receiving inlet of the housing and/or the outer edge of the motor adapter.

In order to limit the axial movement of the motor adapter relative to the housing, according to another embodiment of the invention, the boundary of the opening of the housing accommodating the damping device and the outer edge of the motor adapter radially overlap each other and are axially arranged at a distance from each other, while the damping device is inserted between them. This overlapping can be realized along the entire periphery or on selected peripheral sections.

In a first alternative embodiment, the damping device is an annular membrane, which is extended between the housing and the motor adapter generally radially radial plane, diagonal to the motor axis, U-shaped or Z-shaped.

In a second alternative embodiment, the damping device is formed with a multiplicity of connecting arms, which are generally Z-, S-, I- or U-shaped.

BRIEF DESCRIPTION OF THE DRAWINGS

Other characteristics and advantages of the invention will be evident from the description of several embodiments provided below with reference to the attached figures. The figures show the following:

FIG. 5a shows a radial sectional view of another embodiment;

FIGS. 5b through 5d show several alternative embodiments;

DETAILED DESCRIPTION OF EXEMPLARY EMBODIMENT(S)

Figure 1:
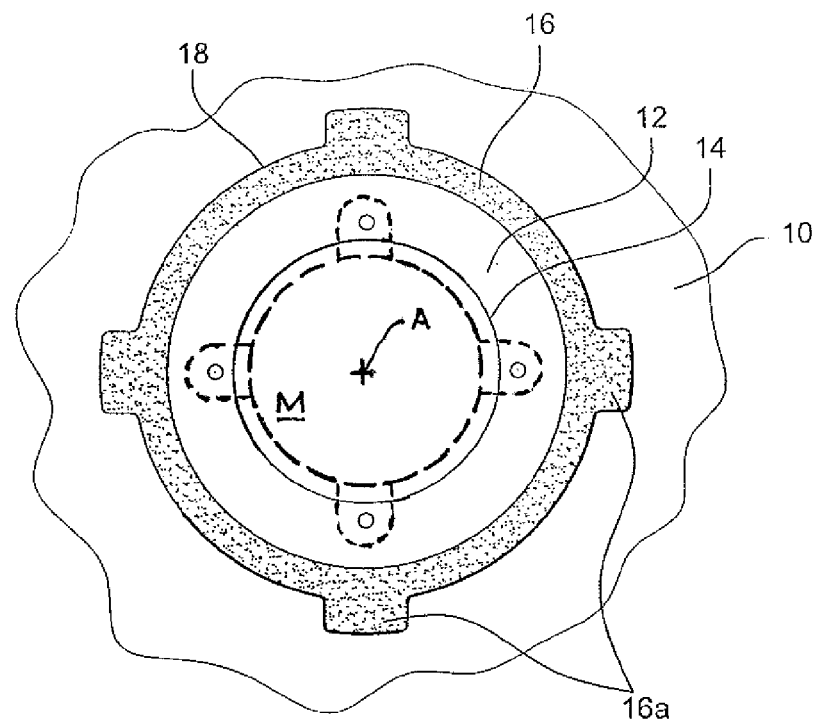
FIG. 1 shows a top view of the mounting device.

Only a fractional part of a housing 10 of a heating, ventilating and/or air conditioning unit for a vehicle is shown in FIG. 1, as only this part is relevant to the device for mounting of a conventional electric blower drive motor M having axis A. The device comprises an annular motor adapter 12 having a circular opening 14 for a blower drive motor and an annular damping device 16, which is inserted in a corresponding opening 18 of the housing 10. The annular damping device 16 in the embodiment is shown in the figure equipped with radial projections 16a, which are respectively arranged at an angle of 90°, and which are oriented in the outward direction and engaged in corresponding recesses of the opening 18 to form a form-lock. Similar radial projections can be also oriented in the inward direction, in which case they will be then engaged in corresponding recesses of the form-locked motor adapter 12.

The device shown in the drawing is fully integrated in the housing 10. The manufacture of the preferred embodiment is realized with the injection moulding method using several components. The housing 10 and the motor adapter 12 are manufactured by injection moulding from a relatively rigid plastic material similar to PP or PA. The annular damping device 16 is injection moulded with a rubber-elastic material, in particular an elastomer material.

This creates an interlocking connection with a form-lock between the housing 10, damping device 16 and motor adapter 12.

Figure 2:
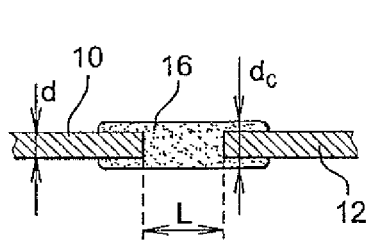
FIG. 2 shows a partial sectional view of a first embodiment.
Figure 3:
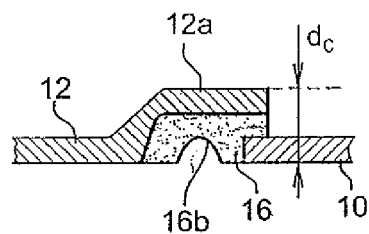
FIG. 3 shows a partial sectional view of a second embodiment.
Figure 4:
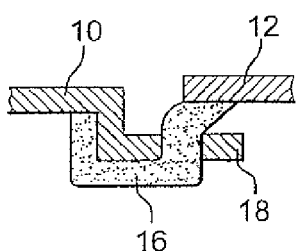
FIG. 4 shows a partial sectional view of another embodiment.

Various embodiments of the damping device and its connections to the housing on the one hand, and to the motor adapter on the other hand are indicated in the FIGS. 2, 3 and 4.

FIG. 2 shows damping device 16, which is provided on its inner and on its outer peripheral surface with a groove enabling a form-lock of the outer edge on the motor adapter 12 or on the inner boundary of the opening 18 of housing 10. The radial distance between housing 10 and motor adapter 12 corresponds to the effective radial width L of the annular damping device. The axial thickness $d_c$ of the annular damping device 16 is only slightly larger than the wall thickness d of the housing 10.

As shown in the embodiment indicated in FIG. 3, the outer edge of the motor adapter 12 slightly overlaps the inner boundary of opening 18 of housing 10 somewhat in the radial direction, while the material of the damping device 16 is inserted in between. This limits the axial relative mobility between motor adapter 12 and housing 10. The overlapping range is in the case of this embodiment determined by the total material thickness $d_c$, which corresponds to two or three times the wall thickness of the housing 10. In order to keep this dimension small (and thus also the axial size), the edge region 12a of the motor adapter 12 is bent and designed with a reduced wall thickness. Further, the annular damping device 16 is provided in its outer periphery with a step, in which the boundary of opening 18 of the housing 10 is suitably accommodated. Furthermore, the damping device 16 is provided with a recess 16b, which has a semicircular form and which is used for the adjustment of the desired damping conduct.

As shown in the embodiment indicated in FIG. 4, the boundary of the opening 18 of the housing 10 is angled twice at right angle, and provided with an aperture which is extended from the damping device 16 in the axial direction to create a form-lock. The annular damping device 16 conforms with its outer periphery to the angled part of the housing 10 and is connected at its inner periphery with the outer edge of the motor adapter 12.

The FIGS. 2, 3 and 4 show respective radial cross-sections. As determined already by the presence of the radial projections 16a (FIG. 1), the damping device 16 is not provided with a constant radial profile throughout its periphery; the embodiments shown in FIGS. 2, 3 and 4 and other alternatives can be equipped with various peripheral sections of the damping device in various combinations.

Sequential casting methods are suitable processes providing an alternative to the manufacturing method using several components with the injection moulding method, wherein the various components are formed with injection moulding sequentially in various forms. Rubber-elastic components can be used, for example, for the damping device, (for example SEBS (Styrol-Ethylene-Butadiene-Styrol-Copolymer). A relatively hard component made of a plastic material, for example polypropylene or polyamide, is used for the housing and for the motor adapter.

There are essentially two possible alternatives available for the realization of the damping device. According to a first principle, the space remaining between the housing and the motor adapter is fully bridged over without any gaps by the damping device. According to a second principle, the damping device bridges with precision over the space between the housing and the motor adapter in many locations. Both principles will now be explained in more detail with reference to FIGS. 5a-5d and 6a-6g.

FIG. 5a shows an embodiment which is based on the first principle. The annular opening of housing 110 surrounds the motor adaptor 112, which is also annular, in a coaxial form and with a radial clearance. The space between the housing 110 and the motor adapter 112 is bridged over with a damping device 116, which forms an annular membrane. The annular membrane is in the alternative embodiment shown in FIG. 5a substantially flat and vertical to the axis A, which corresponds to the axis of the blower drive motor (not shown in the figure).

In the alternative embodiment shown in FIG. 5b, the annular membrane is arranged inclined to the motor axis.

In the alternative embodiment according to FIG. 5c, the annular membrane is formed so as to create in general a U-shape in cross-section.

In the alternative embodiment according to FIG. 5d, the annular membrane is formed so as to create a general Z-shape in cross-section.

Figure 6A:
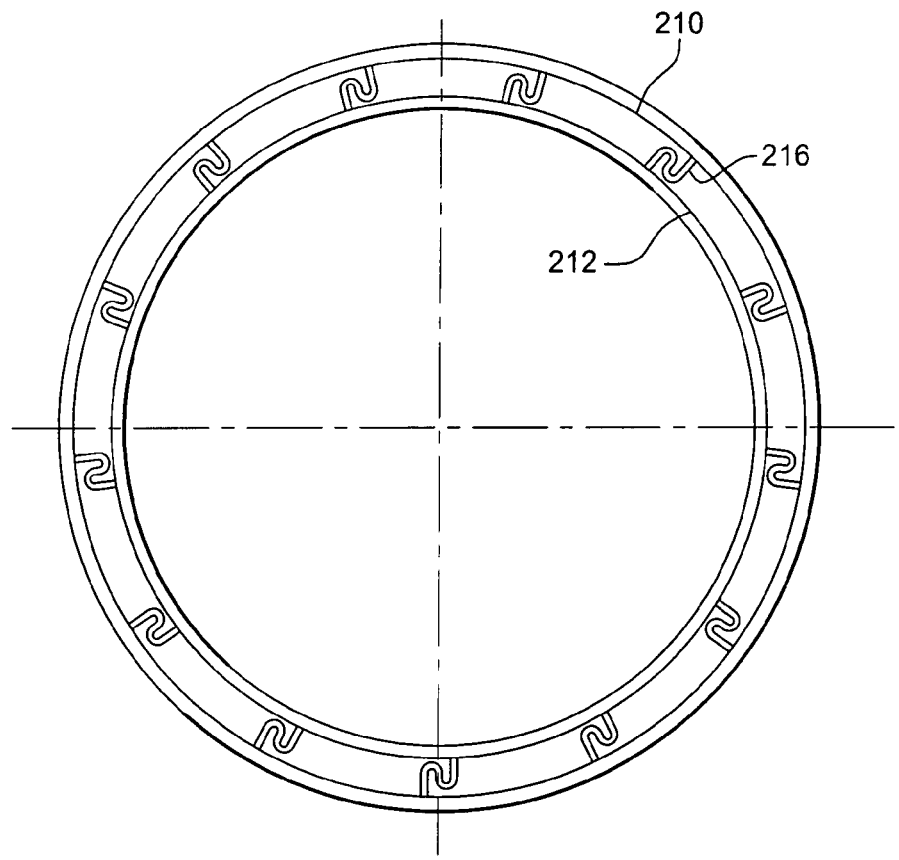
FIG. 6a shows another embodiment in a top view.
Figure 6B:
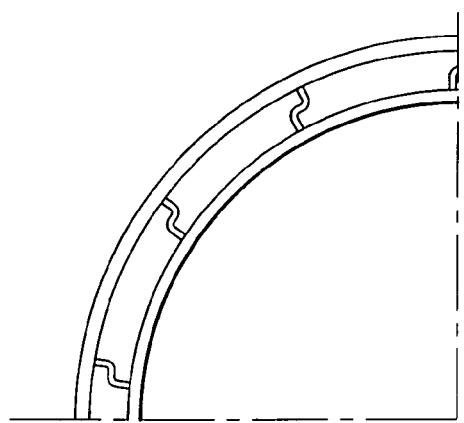
FIGS. 6b through 6g show several alternative embodiments.

The embodiment indicated in FIG. 6a is based on the second principle. Also in this case, the annular opening of housing 210 surrounds the motor adapter 212, which is arranged coaxially and with a radial clearance. The space between the housing 210 and the motor adapter 212 is bridged over with a damping device 216, which is formed from a multiplicity of individual connecting arms. These connecting arms are distributed throughout the circumference at a uniform distance between them. In the alternative embodiment shown in FIG. 6a, the connecting arms are formed so as to create a general Z-shape.

Figure 6C:
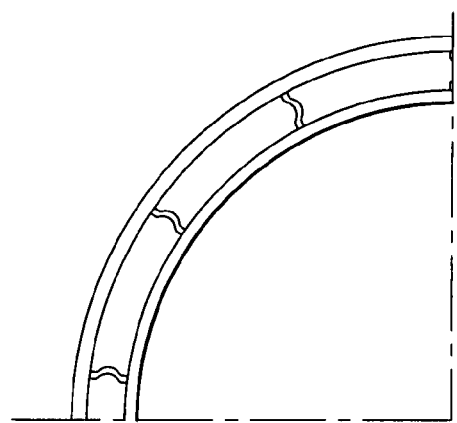
Figure 6D:
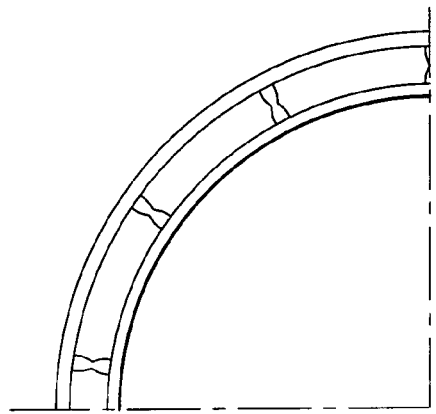
Figure 6E:
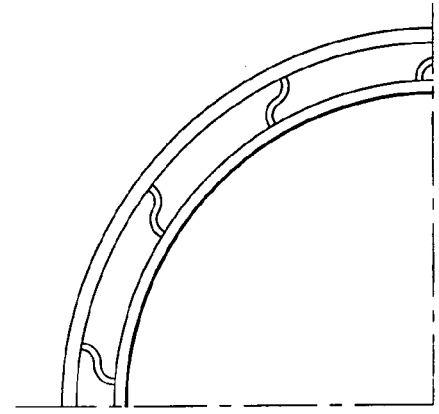
Figure 6F:
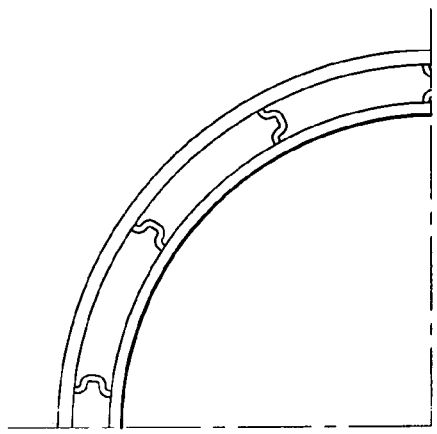
Figure 6G:
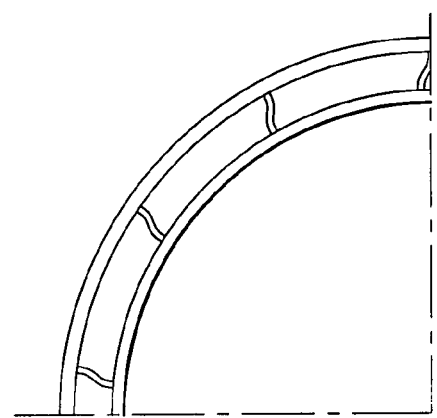

As indicated in FIGS. 6b through 6g, the connecting arms can be provided with a number of different forms, in particular in an S-shape (FIG. 6e), in an I-shape (FIG. 6d), or in a U-shape (FIG. 6c, FIG. 6f).

While in the various embodiments described above, the damping device is extended predominantly in the radial direction between the housing and the motor adaptor, other embodiment forms are also available, according to which the damping device is extended in the axial direction. In each case, the housing, the motor adapter and the damping device are integrated in a uniform structural component.

The invention claimed is:

1. A device for mounting an electric blower drive motor in an opening of a housing of a heating, ventilating and/or air conditioning unit for vehicles, the device comprising:

a motor adapter having an annular configuration and defining a circular opening for receiving the drive motor within the motor adapter and having an outer edge opposite the drive motor defining a diameter of the motor adapter with a space defined between the housing and the motor adapter, and a damping device disposed in the space and having an outer periphery with the outer periphery having a step and with an edge of the housing that defines the opening disposed within the step to couple the motor adapter to the housing, wherein the diameter of the motor adapter is greater than the opening of the housing such that the motor adapter and the housing are mutually overlapping in a radial direction at the edge of the housing, and wherein the dampening device defines a recess having a semicircular configuration for adjusting the dampening of the dampening device.

2. The device according to claim 1, wherein the housing, the damping device, and the motor adapter are integral with each other.

3. The device according to claim 1, wherein the component used to form the damping device is of a rubber-elastic material and the components used to form the housing and the motor adapter are relatively rigid plastic materials.

4. The device according to claim 1, wherein the damping device substantially completely occupies the space remaining between the opening of the housing and the motor adapter.

5. The device according to claim 1, wherein the damping device is provided with a constant profile in the radial direction.

6. The device according to claim 1, wherein the damping device bridges over with precision in the axial direction the space remaining between the housing and the motor adapter.

7. The device according to claim 1, wherein the damping device is formed via a ring made of rubber-elastic material, which surrounds the motor adapter, and which is in turn surrounded by the housing.

8. The device according to claim 7, wherein the ring is equipped with radial projections, which are engaged in corresponding recesses of at least one of the opening of the housing and the motor adapter form-locked.

9. The device according to claim 1, wherein the damping device overlaps in the radial direction the boundary of at least one of the opening of the housing and the outer edge of the motor adapter.

10. The device according to claim 1, wherein the material thickness in the axial direction in the overlapping range corresponds to approximately two to three times the thickness of the material of the wall of the housing.

11. The device according to claim 1, wherein the recesses of the damping device are realized in at least one of the boundary of the opening of the housing and the outer edge of the motor adapter in a form-lock.

12. The device according to claim 1, wherein the damping device is equipped with at least one of selective recesses and material recesses for the adjustment of the damping conduct.

13. The device according to claim 1, wherein the connecting arms are formed so as to create a generally Z-shape.

14. The device according to claim 1, wherein the connecting arms are formed so as to create a generally U-shape.

15. The device according to claim 1, wherein the outer periphery of the damping device defines a diameter which is greater than the opening of the housing such that the damping device, the motor adapter, and the housing are mutually overlapping in the radial direction at the edge of the housing.

16. The device according to claim 1, wherein the opening of the housing defines an axis extending through a centerpoint of the opening with the motor adapter disposed within the opening of the housing and aligned in a radial direction relative to the axis with the edge of the housing defining the opening.

17. The device according to claim 16, wherein the motor adapter disposed within the opening of the housing is coplanar with the edge of the housing defining the opening.

* * * * *

UNITED STATES PATENT AND TRADEMARK OFFICE
CERTIFICATE OF CORRECTION

| | | |
|---|---|---|
| PATENT NO. | : 8,585,005 B2 | Page 1 of 1 |
| APPLICATION NO. | : 11/818409 | |
| DATED | : November 19, 2013 | |
| INVENTOR(S) | : Krempel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 689 days.

Signed and Sealed this
Twenty-fourth Day of March, 2015

Michelle K. Lee
*Director of the United States Patent and Trademark Office*